July 18, 1972 C. C. EVANS 3,677,713
FURNACE FOR THE MANUFACTURE OF CERAMIC WHISKERS
Original Filed May 14, 1968
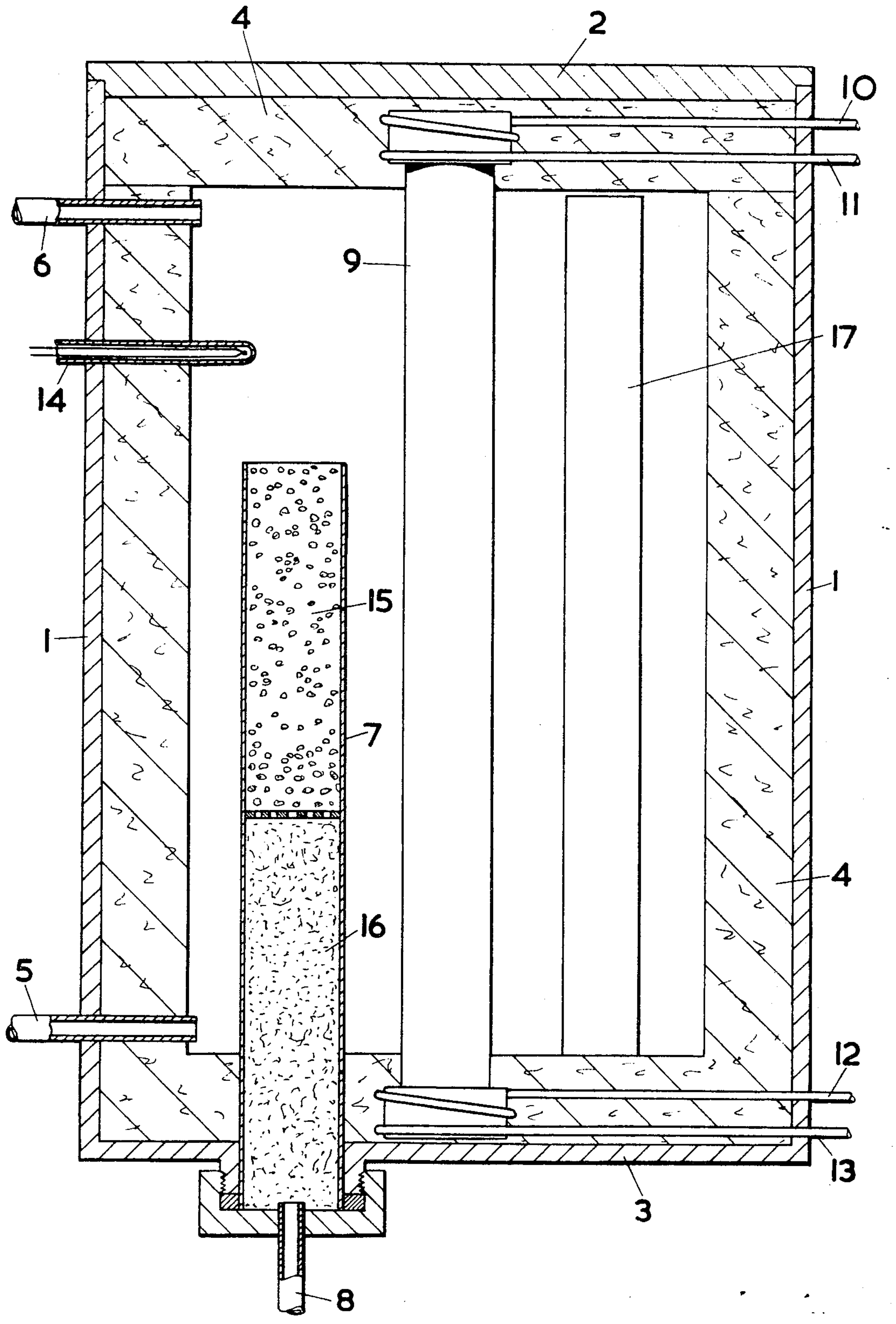

United States Patent Office 3,677,713 Patented July 18, 1972

3,677,713

FURNACE FOR THE MANUFACTURE OF CERAMIC WHISKERS

Christopher Charles Evans, Saffron Walden, England, assignor to the Secretary of State for Defence in the Government of the United Kingdom Continuation of application Ser. No. 729,081, May 14, 1968, which is a continuation-in-part of application Ser. No. 406,127, Oct. 23, 1964, now Patent No. 3,394,991, dated July 30, 1968. This application Nov. 27, 1970, Ser. No. 93,428
Claims priority, application Great Britain, Oct. 28, 1963, 42,439/63
Int. Cl. B01j *17/28*
U.S. Cl. 23—277 R 11 Claims

ABSTRACT OF THE DISCLOSURE

A furnace particularly suitable for the manufacture of ceramic materials in whisker form comprises a hollow casing lined internally with thermally insulating material and enclosing a reaction space, a carbon electrode disposed within the casing and capable of heating said reaction space to a high temperature, at least one container for containing a solid chemical reactant provided within the casing and having an opening into said reaction space, means for passing gas from a source outside the casing through the said container and into said reaction space, means for passing gas directly into said reaction space and means for removing gas from said reaction space.

This application is a continuation of application Ser. No. 729,081 filed May 14, 1968 and now abandoned which is a continuation-in-part of application Ser. No. 406,127, filed Oct. 23, 1964, now U.S. Pat. No. 3,394,991, issued July 30, 1968.

The invention relates to improvements in furnaces and particularly to improvements in furnaces suitable for carrying out high temperature chemical reactions leading to the production of ceramic whiskers. The term whisker is generally applied to any single crystal fibre having a thickness less than about 0.1 mm. and a length to thickness ratio of at least 100.

The production of ceramic whiskers, for example the production of silicon nitride whiskers described in the specification accompanying our U.S. application Ser. No. 406,127 normally involves the evaporation of a solid starting material, the interaction of the evaporated material with gaseous reactants in a heated reaction zone and formation of the ceramic whisker product on a substrate adjacent the reaction zone maintained normally at a temperature somewhat less than that of the reaction zone. A furnace in which such processes may be carried out thus requires a relatively large hot zone in which gas-phase reactions may take place; a relatively large substrate area adjacent the hot zone upon which the low specific gravity whisker product may form in useful quantities without encroaching excessively upon the hot-zone; and means to evaporate the solid starting material directly into the hot zone. The present invention aims to provide a furnace having these desirable characteristics and which is eminently suited to the production of ceramic whiskers.

According to the present invention, a furnace comprises a hollow casing lined internally with thermally insulating material and enclosing a reaction space, a carbon electrode disposed within the casing and capable of heating the reaction space to a high temperature, at least one container for containing a solid chemical reactant provided within the casing and having an opening into the reaction space, means for passing gas from a source outside the casing through the said container and into the reaction space, means for passing gas directly into the reaction space and means for removing gas from the reaction space.

The reaction space preferably should be surrounded by a substrate upon which ceramic whiskers may form composed, for example, of alumina, mullite, silicon carbide or carbon. Where carbon is used as substrate it may conveniently be in the form of carbon cloth and act in the dual capacity of substrate and thermal insulation.

A furnace and its use for the production of silicon nitride whiskers in accordance with the invention will now be described with reference to the accompanying drawing which shows a vertical cross-sectional view through the furnace. The furnace described provides a large hot zone in which silicon nitride whiskers may be formed and the furnace can be scaled up to any desired size. The hot zone illustrated in the drawing is cylindrical and has a volume of about 2.5 cu. ft.

The furnace comprises an outer casing consisting of cylinder 1 having end faces 2 and 3 and the inner sides of the casing are covered with thermal insulating material 4. Inlet pipe 5 and outlet pipe 6 pass through the wall of the outer casing and allow gases to be passed into, and removed from, the interior of the furnace.

Disposed within the outer casing is a container consisting of a hollow tube 7 having an inlet pipe 8 leading to it from a point outside the outer casing. A number of containers having this construction may be provided, thus increasing the capacity of the apparatus.

A carbon heating electrode 9 is fitted within the casing and copper pipes 10, 11, 12 and 13 are provided to pass electric current through the carbon electrode and at the same time to allow cooling water to be circulated around each end of the electrode. In addition to the carbon electrode, auxiliary heating means may be fitted to the containers disposed within the outer casing to allow for regulation of the temperature at which the containers are heated.

Temperatures within the outer casing may be continuously monitored by a thermocouple 14 and the whisker product may be removed from the apparatus by removing the end face 2 which is constructed in the form of a lid.

A typical example of a process for the manufacture of silicon nitride whiskers in the furnace hereinbefore described will now be given.

120 g. of an equimolar silicon/silica mixture are introduced into the container 7 to form a bed 15, and a heavy electric current is passed through the electrode 9 to heat it to about 1550° C. The space within the outer casing and the bed 15 are thus heated to about 1440° C. and argon gas then s passed into the inlet tube 8 at a rate of about one litre/minute and through the bed 15 which is heated to about 1475° C. The argon is pre-heated before it reaches the bed 15 by interposing carbon granules 16 between the inlet tube 8 and the bed. As described hereinbefore, hydrogen or a hydrocarbon may be introduced with the stream of nitoogen before the gases pass through the bed. Where 1% of hydrogen is introduced this should be at a flow rate of about 30 mls./minute.

Silicon-containing vapours formed in the heated bed 15 are carried by the argon gas into the reaction space enclosed by the outer casing where they mix, in the presence of carbon and a small amount of hydrogen, with nitrogen introduced directly into the reaction space at a rate of about three litres/minute through the inlet tube 5, and form silicon nitride whiskers. The silicon nitride whiskers may grow upon the surface of the lagging if the lagging is composed of a suitable substrate material such as carbon particularly in the form of carbon cloth, but the silicon nitride whiskers are preferably grown upon one or more mullite surfaces 17 which are provided within the reaction space. The used gases pass out through the outlet pipe 6.

About 70 g. of silicon nitride whisker product are obtained after a reaction time of 60 hours. The product has the appearance of a white, fibrous mass and is found to consist mainly of silicon nitride whiskers having a thickness of between about 1 to 2 microns and a length of up to about 7 cm. The whisker product has a very low density, 1 cubic centimeter of whiskers weighing about one five-hundredth of a gramme. It will be appreciated that 70 grammes of whiskers represent a considerable yield, especially in relation to the prior art in which a yield of one-tenth of a gamme has been considered very satisfactory.

I claim:

1. A furnace which comprises a hollow casing lined internally with thermally insulating material and enclosing a reaction space, a carbon electrode disposed within the casing and capable of heating said reaction space to a high temperature, at least one container containing a solid chemical reactant provided within the casing and having an opening into said reaction space, means for passing gas from a source outside the casing through the said container, through said solid chemical reactant, and through said opening into said reaction space, further means for passing gas from a source outside the casing directly into said reaction space, and means for removing gas from said reaction space.

2. A furnace according to claim 1 in which the hollow casing is cylindrical and in which the said electrode is disposed longitudinally and extends between the end faces of the cassing.

3. A furnace according to claim 2 and having at least one rod or tube or substrate material positioned longitudinally within the casing.

4. A furnace according to claim 1 wherein the thermally insulating material is carbon cloth.

5. A furnace according to claim 1 and in which a substrate is provided within the hollow casing consisting of mullite, alumina, or silicon carbide.

6. A furnace according to claim 1 and including means for water-cooling the electrode.

7. A furnace according to claim 1 and in which the said container contains a mixture of silicon and silica.

8. A furnace according to claim 1 which comprises a cylindrical casing, two end faces one of which is attached to each end of the said casing, one end face being arranged to be removeable from the said casing, a carbon electrode running the length of the casing and having its longitudinal axis substantially parallel to the longitudinal axis of the said cylindrical casing, means for supplying a heavy electrical current through the carbon electrode, means for cooling the extreme ends of the electrode, at least one cylindrical container disposed within the said cylindrical casing, means for passing gas from an external source through the container, through said solid chemical reactant and through said opening into the said cylindrical casing, means for passing gas from an external source directly into the cylindrical casing, a lining of thermally insulating material provided adjacent the inside of the cylindrical casing to prevent excessive heat loss from the inside of the cylindrical casing, and at least one substrate selected from the group comprising carbon, mullite, silicon carbide and alumina provided within the cylindrical casing.

9. A furnace which comprises a hollow casing lined internally with thermally insulating material and enclosing a reaction space, a carbon electrode disposed within the casing and capable of heating said reaction space to a high temperature, at least one container for containing a solid chemical reactant disposed within the reaction space between said carbon electrode and said casing and having an opening into said reaction space, means for passing gas from a source outside the casing directly through the said container at a temperature sufficient to evaporate reactant vapor into said reaction space, means for passing gas directly into said reaction space and means for removing gas from said reaction space.

10. Apparatus as claimed in claim 9 and in which the container is divided into two communicating compartments comprising a first compartment occupying that part of the container nearest said external supply of gas and adapted to contain a bed of pre-heating material and a second compartment remote from said gas supply for containing said solid reactant, whereby gas entering the first compartment is pre-heated and passes through the second compartment to evaporate the solid reactant and transport resulting reactant vapor into the reaction zone of the furnace.

11. A furnace for the manufacture of silicon nitride whiskers which comprises a cylindrical casing, two end faces one of which is attached to each end of the said casing, a carbon electrode in the form of an impervious hollow tube open at the top running the length of the casing and having its longitudinal axis substantially parallel to the longitudinal axis of the said cylindrical casing, means for supplying a heavy electrical current through the carbon electrode, means for cooling the extreme ends of the electrode, at least one cylindrical container offset from said electrode disposed within said cylindrical casing, means for supplying gas directly to said cylindrical container from an external source and means for passing gas from an external source directly through the container and thereby into the said cylindrical casing, a lining of thermally insulating material provided adjacent the inside of the cylindrical casing, and at least one substrate selected from the group consisting of carbon, mullite, silicon carbide and alumina provided within the cylindrical casing.

References Cited

UNITED STATES PATENTS

| | | | |
|---|---|---|---|
| 2,123,158 | 7/1938 | Ridgway | 13—20 |
| 2,551,341 | 5/1951 | Scheer et al. | 13—25 X |
| 3,036,888 | 5/1962 | Lowe | 23—191 |

JAMES H. TAYMAN, JR., Primary Examiner

U.S. Cl. X.R.

23—284, 191, 264, 294; 13—7, 20, 25, 31; 148—1.6; 106—55; 118—48

UNITED STATES PATENT OFFICE

CERTIFICATE OF CORRECTION

Patent No. 3,677,713 Dated July 18, 1972

Inventor(s) Christopher Charles Evans

It is certified that error appears in the above-identified patent and that said Letters Patent are hereby corrected as shown below:

Please change the heading to read:

--Claims priority, application Great Britain, Oct. 28, 1963, 42,439/63 and application Great Britain, April 11, 1968, 17728/68.--

Signed and sealed this 8th day of May 1973.

(SEAL)
Attest:

EDWARD M.FLETCHER,JR.
Attesting Officer

ROBERT GOTTSCHALK
Commissioner of Patents